May 7, 1940.  A. H. NELSON  2,200,187
GAS VALVE
Filed Jan. 24, 1938
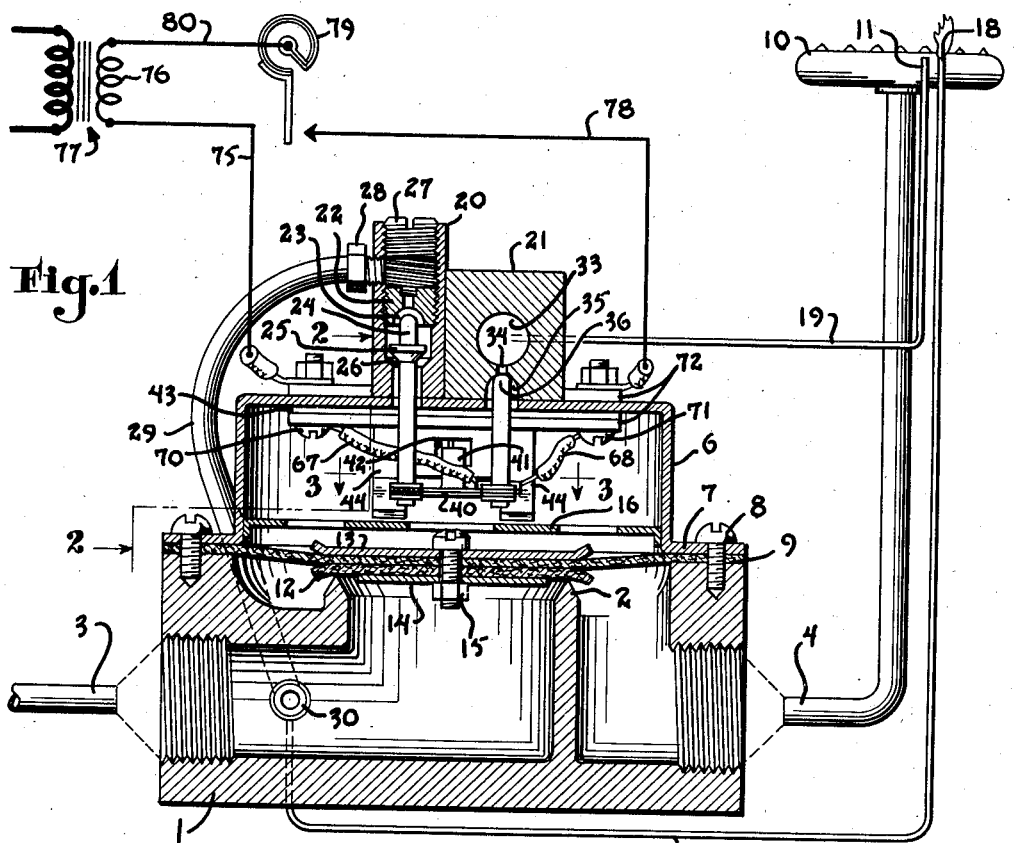
Fig.1
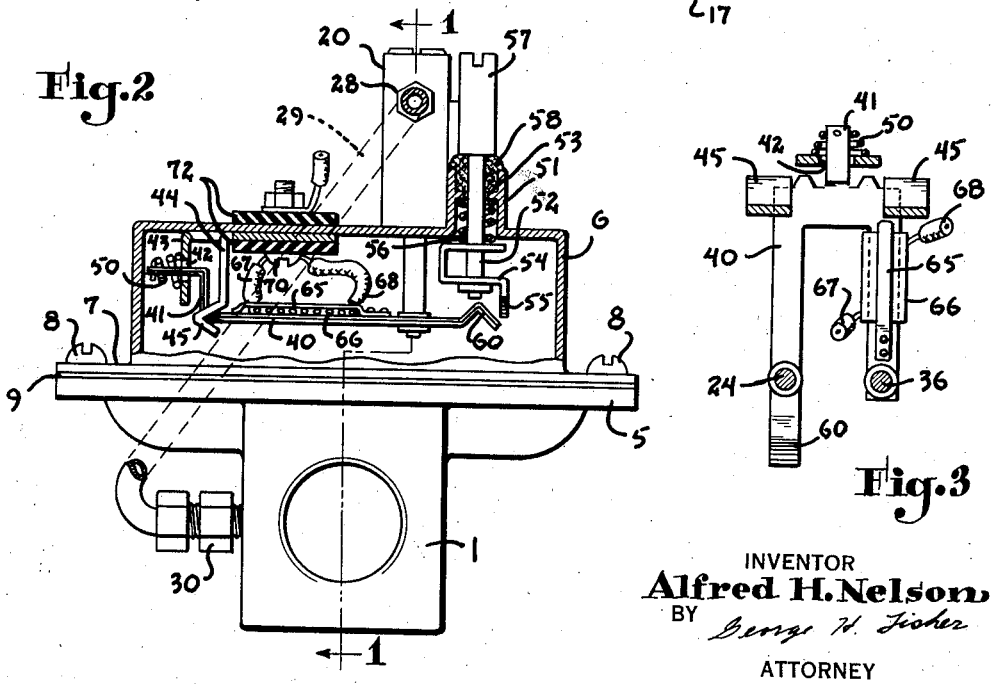
Fig.2
Fig.3
INVENTOR
Alfred H. Nelson
BY
ATTORNEY Patented May 7, 1940

2,200,187

UNITED STATES PATENT OFFICE 2,200,187

GAS VALVE

Alfred H. Nelson, Minneapolis, Minn., assignor to Minneapolis-Honeywell Regulator Company, Minneapolis, Minn., a corporation of Delaware Application January 24, 1938, Serial No. 186,631

9 Claims. (Cl. 137—139)

My invention relates to gas flow control devices for gas heaters and the like, and is more particularly concerned with a temperature responsive pilot controlled gas valve.

Pilot controlled gas valves are well known in the art, there being various conventional structural arrangements whereby a smaller pilot valve, or pilot valves, is controlled by a thermostat and in turn the pilot valve controls a main valve. Such gas valves generally take the form of a diaphragm type valve having pilot valves arranged to govern the pressures affecting the diaphragm. The diaphragm may be conventionally arranged to have its lower surface exposed to gas main pressure; a three-way pilot valve arrangement may then be employed to admit gas main pressure to the space above the diaphragm for closing the valve and to bleed pressure from the space above the diaphragm when it is desired to open the valve. The area of the diaphragm exposed to gas main pressure is usually proportioned to the seat area so as to produce a snap action; that is, as soon as the valve lifts, the additional seat area exposed to pressure in the main adds substantial lifting force and raises the diaphragm with a snap action.

In the past it has been quite common to utilize solenoid type pilot valves for controlling the main valve. Such practice entails considerable expense for the pilot valves and adds to the bulkiness of the control mechanism generally. It has also been quite generally characteristic of known gas valves that a continuous bleed through the diaphragm chamber existed in the open position of the valve. It is one of the primary objects of my invention to eliminate continuous bleed through the diaphragm chamber of the gas valve. To accomplish this object I employ a structural arrangement such that only a momentary bleed takes place from the diaphragm chamber at the time the valve is opened. At no time is there a continuous bleed from the gas supply through the diaphragm chamber and to the point of utilization of the gas as prevails in heretofore known gas valves.

Among other objects of my invention are:

To provide a pressure operated valve controlled by pilot valves having an inherent lag between operation of the said pilot valves. This object relates to a structural arrangement of pilot valves and means for operating them whereby the inlet bleed port to a bleed chamber is closed before the outlet bleed port is opened when the main valve is operated in one direction, and the outlet bleed port is closed before the inlet bleed port is opened when the main valve is operated in the opposite direction.

To provide a diaphragm gas valve incorporating therein inlet and outlet pilot valves operated by a bimetal element so arranged as to inherently cause sequential operation of the pilot valves.

To provide in a diaphragm gas valve a forked bimetallic pilot valve operating element having a pilot valve actuated by each leg of the forked element, the said forked element being pivoted and biased in one direction about the pivot point, the construction and arrangement being such that when one leg of the forked element is heated or cooled, opening and closing movements of the pilot valves will taken place sequentially without overlap so that there is no continuous bleed through the bleed chamber controlled by the pilot valves.

To provide an inexpensive but rugged and efficient pilot controlled diaphragm gas valve utilizing inexpensive interchangeable parts and occupying a minimum of space.

To provide in a pilot controlled diaphragm gas valve, manual operating means and a pilot valve arrangement controlled thereby so that the gas valve may be manually operated with only a momentary bleed from the bleed chamber.

To provide a bimetallic actuating mechanism for a valve or the like to be controlled from a remote temperature, the said mechanism being automatically operable to compensate itself for ambient temperatures.

Other objects, purposes, and advantages of my invention will make themselves apparent to those skilled in the art from the accompanying drawing and detailed description.

Fig. 1 of the drawing is a sectional view of the valve of my invention taken along line 1—1 of Fig. 2, the manner of connecting the valve in a burner circuit, and the control thermostat therefor being diagrammatically illustrated.

Fig. 2 is a side view partly in section taken along the line 2—2 of Fig. 1.

Fig. 3 is a plan view of a detail taken along line 3—3 of Fig. 1.

Referring to Figures 1 and 2 of the drawing, numeral 1 represents the body of my improved valve, the body being interiorly configurated so as to form a seat at 2 and having a gas inlet as indicated at 3 and an outlet at 4 for conveying gas to a conventional burner 10 which may be employed in a system for heating rooms of a building. A small pipe 17 conveys a supply of fluid fuel from the inlet side of the valve to a constantly burning pilot burner 18. The upper part of the valve body is of circular flanged conformation as can be seen at 5. Numeral 6 indicates a generally cylindrical cap or cover for the valve, having a flanged portion 7 corresponding to the flange 5 of the valve body. The flange 5 of the valve body and the flange 7 are secured to each other by screws 8, having interposed therebetween in sealing engagement therewith the peripheral portion of a circular diaphragm 9. The diaphragm 9 may be made of leather or other suitable material such as is conventionally used in diaphragm type valves. Adjacent the central portion of the diaphragm 9 is a seat disc 12 which may also be made of leather or other suitable material. Arranged on opposite sides of the diaphragm 9 and disc 12 are metal disc members 13 and 14 which serve to secure the diaphragm 9 and disc 12 in relation to each other, and which are drawn towards each other by means of a bolt 15 which extends through a central aperture in all three of the discs and through the diaphragm.

Cover member 6 of the valve forms a pressure chamber above the diaphragm 9 and has rigidly secured therein a diaphragm plate 16 which serves as a stop to limit the upward travel of the diaphragm valve. On the upper surface of the cover 6 are metal blocks 20 and 21 which may be integrally formed with the cover 6 or may be welded or soldered thereto. The block member 20 is internally screw-threaded and has a screw plug 22 therein having a seat 23 for an inlet pilot valve 24. The inlet pilot valve has a second valve portion 25 which may be seated on seat 26 at the lower part of the opening in the block member 20. The upper end of the block member 20 is sealed by a screw plug 27. Above the screw plug 22 is a connection 28 for a tube 29 which provides for communication of pressure from the inlet side of the main valve from the connection at 30 to the inlet pilot valve. The block member 21 has an internal horizontal arranged opening 33 with which communicates a vertical port 34. Opening 33 communicates by a pipe 19 with a small burner 11 for gas released from within cover 6. The lower end of the port 34 communicates with a larger opening 35 which forms a seat for an outlet pilot valve 36. The stems of the inlet and outlet pilot valves extend through suitable openings in the cover 6 as shown, and are connected to the legs of a forked bimetallic temperature responsive thermostatic element 40. The bimetallic element 40 provides a means for actuating the pilot valves of my invention and the structural manner of mounting this element is an important feature of the invention. It will be seen that the forked element 40 has an integral angular portion 41, one leg of the angular portion 41 extending horizontally through an opening 42 in a bracket 43. The bracket 43 also has downwardly extending leg portions 44 which are angularly crimped as seen at 45, so as to pivotally receive the corners of the base portion of the forked element 40 (see Figures 2 and 3). The forked element 40 is biased in a counter-clockwise direction, that is, the seating direction of the pilot valves by a coil spring 50, one end of which engages the apertured leg of the bracket 43 and the other end of which is attached to the angular portion 41 of the forked element 40.

The leg of the forked bimetallic element which is connected to the outlet pilot valve 36 has clamped thereto by a resilient clamping member 65, an electrical heating element 66. The heating element 66 is connected by electrical conductors 67 and 68 to bolts 70 and 71 which serve to secure the bracket 43 to the top of the cover 6 and which are spaced therefrom by the insulating spacing members 72. Externally of the cover 6 the bolt 70 may be connected by conductor 75 to the secondary 76 of the step-down transformer 77, and the bolt 71 is connected by conductor 78 to a room thermostat 79. The room thermostat 79 is connected by conductor 80 to the other terminal of the secondary winding 76 of transformer 77. The room thermostat 79 may be of the conventional bimetallic element type, and is arranged to complete an electrical circuit through the heating element 66 at a predetermined temperature adjacent the thermostat, energy being received from the transformer 77 which is connected to a source of electric power not shown.

It will be understood that my improved gas valve is controlled by the room thermostat 79, and it is an important structural feature of the invention that control of the valve is unaffected by ambient temperatures. The manner of control of the valve and compensation for ambient temperatures will be more fully explained in the description of operation following.

Referring to Figure 2, it will be seen that adjacent the block member 20 on the cover of the valve is a circular upstanding portion 51 arranged to form a bearing for a manual operating stem 52. The stem 52 extends through an opening formed within a horizontal flange portion 53 within the member 51 and carries an angularly configurated member 54 at its lower end which has a portion 55 formed so as to act in the manner of a cam. A coil spring 56 is engaged between the flange 53 and the angular member 54, and biases the manual operating stem 52 downwardly so that the upper portion of the stem 57 which is of larger diameter engages packing material 58 within the upstanding portion 51. The packing material 58 serves to render the interior of the cover 6 of the valve gas tight. It will be seen that one leg of forked element 40 is longer than the other and is angularly crimped, as seen at 60, so that it may be engaged by the downwardly extending cam-like portion 55 of the angularly configurated member 54. Obviously, when the manual operating stem 52 is turned either by means of a screw-driver or the thumb and forefinger, so that member 55 engages the crimped portion 60, the forked element 40 will be moved in a clockwise direction about its pivot point. As is apparent from Figures 1 and 2, this action will unseat the outlet pilot valve 36 and will seat the valve 25 on the lower seat 26 within the block member 20.

The operation of my improved gas valve may be understood from the following description taken in connection with the various figures of the drawing. It will be seen that as in Figure 1, when the heater 66 is cold the outlet pilot valve 36 is seated and it is urged against its seat by reason of the coil spring 50 biasing the forked bimetallic element 40 in a counter-clockwise direction (as seen on Fig. 2). When the thermostat 79 closes the heater circuit indicating a call for heat in the spaces being heated, the shorter leg of the element 40 warps in a direction which would unseat the outlet pilot valve 36 except that the coil spring 50 rotates the forked element 40 bodily in a counter-clockwise direction, thereby keeping valve 36 seated as the shorter leg warps downwardly until the inlet pilot valve 24 becomes seated. When the inlet pilot valve 24 becomes seated, coil spring 50 is prevented from further rotating element 40 in a counter-clockwise direction. Further downward or clockwise warping of the shorter leg of element 40 then unseats the outlet pilot valve 36. This releases the gas pressure above diaphragm 9 within cover 6 through the pipe 19 and to the pilot flame 11. The inlet pressure acting on the main valve then causes it to lift and as soon as it unseats, the additional force exerted by reason of the pressure acting on the entire lower surface of the diaphragm 9 causes the valve to move upwardly with a snap action until it meets the stop diaphragm 16. Gas will then flow through the valve to the burner and heat will be supplied as long as the pilot valves are in their present positions. When the thermostat 79 opens the heater circuit indicating that the room has been heated to the proper temperature, the heater is deenergized and the shorter leg of element 40 tends to warp in the closing direction of the outlet pilot valve 36. Element 40 does not now move about its pivot until valve 36 becomes seated, as it is prevented from doing so by reason of valve 24 being seated. Further warping of the shorter leg of element 40 in a counter-clockwise direction or, that is, seating direction of valve 36 after valve 36 seats causes element 40 to be bodily moved about its pivot in a clockwise direction. Thus, after valve 36 becomes seated the valve 24 will be opened, admitting pressure from the inlet side of the main valve into the chamber 6 above the diaphragm 9. Pressure above the diaphragm 9 will now be the same as the pressure below it, and the valve will tend to settle due to its own weight. As soon as the valve approaches its seat, the pressure underneath the diaphragm at its outer portions will be lessened and the valve will then seat itself with a snap action. From the above, it is seen that there is an inherent time lag between the operation of the inlet and outlet pilot valves. That is, when the main valve is to be opened, valve 36 cannot open to release pressure from above the diaphragm until valve 24 has seated. When the main valve is to be closed, on the other hand, valve 24 cannot become unseated until after valve 36 has closed. Thus the mechanism of my invention provides a simple device which inherently prevents a continuous flow of gas through the chamber 6 and to the pilot burner. Only a momentary bleed of gas into or out of the cover chamber 6 is necessary for operation of the valve.

Any warping of the legs or branches of the forked element 40 due to ambient temperatures is automatically compensated for by reason of the structural arrangement of the forked element and the pilot valves. Should ambient temperatures cause both legs to warp any amount, this warping will of course be in the same direction for both legs. If for example, with the parts in the position shown in Figure 1 should both legs be warped upwardly due to ambient temperatures it will be seen that valve 36 being seated cannot move upward and therefore element 40 will be moved downwardly or clockwise about its pivot an amount equal to the amount of the warping. It follows that the upward and downward components of movement neutralize each other and the valves remain in their same positions, unaffected by ambient temperatures.

If at any time it should be desired to manually open the valve, this may be done by rotating stem 52 (Fig. 2) so as to bring member 55 into engagement with the crimped portion 60. Thus forked element 40 may be bodily rotated in a clockwise direction by portion 60 being forced down, this action seating valve 25 and opening outlet pilot valve 36. Closure of valve 25 cuts off the pressure to chamber 6 and the gas therein is released to the burner 11. The diaphragm then snaps upwardly to open the main valve in the same manner as above described. It will be seen that when the pilot valves are automatically operated they are moved in opposite directions. By providing the auxiliary valve 25 and seat 26, my valve may be operated manually by moving both pilot valves in the same direction thereby necessitating only a single movement for doing so.

From the foregoing it is apparent that my improved gas valve reduces the amount of gas necessary for operation of the valve to a minimum. The valve is therefore very economical and its characteristic by which it functions to positively prevent continuous bleed is an inherent one which cannot get out of adjustment nor, due to its nature, is it likely to get out of order. All the operative parts of the valve are of an extremely simple, sturdy and inexpensive nature, yet the arrangement is obviously very reliable and efficient. The manual operating feature is very simple yet does not endanger the adjustment of the automatic parts of the operating mechanism.

There are many modifications and forms which my invention may take and it is to be understood that the single embodiment disclosed is to be interpreted as illustrative only and the invention is to be limited only as determined by the appended claims.

I claim as my invention:
1. In a diaphragm gas valve, in combination, a pressure chamber above the diaphragm, pilot valves for communicating pressure to and from said chamber, a forked element in said chamber, the stem of each of said pilot valves being connected to one leg of said forked element, said element being pivoted adjacent the joined portions of its legs and biased about its pivot by a spring urging said valves toward their seats, one leg of said forked element comprising bimetal adapted to be heated by a thermostatically controlled heater adjacent said bimetal, said pilot valve connected to said bimetal leg being closed when said heater is deenergized and said other pilot valve being open, said bimetal warping in valve opening direction upon being heated and causing rotation of said forked element about its pivot in valve closing direction until said other pilot valve closes whereupon further warping unseats said pilot valve connected to said bimetal leg.

2. In a fluid flow controlling valve in combination, a pressure chamber for regulating said valve, an inlet pilot valve for communicating pressure to said chamber, said inlet pilot valve having upper and lower seats whereby the inlet to said chamber can be sealed by reciprocating the stem of said inlet pilot valve in either direction, an outlet pilot valve for releasing pressure from said chamber, means for actuating said pilot valves to operate said flow controlling valve, and manual means for seating said inlet pilot valve on its lower seat and opening said outlet pilot valve whereby said flow controlling valve may be manually operated.

3. A valve actuating device comprising a forked temperature responsive element, a valve actuated by each branch of said forked element, said element being pivoted and biased about its pivot in such direction that both valves are urged towards their seats, seating of one valve resisting the bias of the forked element about its pivot, said forked element being so arranged that upon heating of the branch associated with the seated valve, said branch warps in valve opening direction thereby allowing said forked element to be moved by its bias in valve closing direction until the other valve seats whereupon further warping of said heated branch unseats the said one valve.

4. In a fluid flow controlling valve, inlet and outlet pilot valves for regulating the controlling valve, means comprising a forked bimetallic heat responsive element for actuating said pilot valves, said element having one branch arranged for actuating each pilot valve, and said element being so constructed and arranged that ambient temperatures affecting both branches of the forked element have no effect on the operation of the pilot valves.

5. In a fluid flow controlling valve, inlet and outlet pilot valves for regulating the controlling valve, means comprising a forked bimetallic heat responsive element for actuating said pilot valves, said element having one branch arranged for actuating each pilot valve and being pivotally mounted and biased about its pivot in valve closing direction of the pilot valves so as to hold one pilot valve against its seat whereby ambient temperatures affecting both branches of the forked element causing them to warp in one direction cause the element to move about its pivot an equal amount in the opposite direction so that ambient temperatures do not influence the operation of the valves.

6. In a fluid flow controlling valve, in combination, means forming a pressure chamber for regulating the valve, an inlet pilot valve having open and closed positions for communicating pressure to said chamber, an outlet pilot valve having open and closed positions for releasing pressure from said chamber, one of said pilot valves having upper and lower seats whereby communication with said chamber through said one pilot valve can be cut off by reciprocating its stem in either direction, means for actuating said pilot valves to control the pressure in said pressure chamber and manual means for actuating both pilot valves whereby said one pilot valve is seated on one of its seats and the other pilot valve is moved from one position to another.

7. In combination, two valves, means comprising a warpable element for actuating said valves, said means being pivoted and biased about its pivot so as to seat one of said valves, said valves being so arranged with respect to said element that rotation of said element about its pivot in one direction moves both valves in closing direction, said means operating upon warping of said element in a direction tending to open said one valve to move about its pivot in closing direction of the other valve.

8. In combination, two valves, means comprising a warpable element for actuating said valves, said means being pivoted and biased about its pivot so as to seat one of said valves, said valves being so arranged with respect to said element that rotation of said element about its pivot in one direction moves both valves in closing direction, said means operating upon warping of said element in a direction tending to open said one valve to move about its pivot in closing direction of the other valve, manually operable means for actuating said valves, said valves being so constructed and arranged that one of said valves can be opened and one closed simultaneously by manipulating said manual means.

9. In combination, two valves, means comprising a warpable element for actuating said valves, said means being pivoted and biased about its pivot so as to seat one of said valves, said valves being so arranged with respect to said element that rotation of said element about its pivot in one direction moves both valves in closing direction, said means operating upon warping of said element in a direction tending to open said one valve to move about its pivot in closing direction of the other valve, said means having structural characteristics whereby rotation thereof caused by warping of said element moves said other valve towards its seat and seats it preventing further rotation of said means whereupon further warping of said element unseats said one valve.

ALFRED H. NELSON.